US008676729B1

(12) United States Patent
Keralapura et al.

(10) Patent No.: US 8,676,729 B1
(45) Date of Patent: Mar. 18, 2014

(54) NETWORK TRAFFIC CLASSIFICATION USING SUBSPACE CLUSTERING TECHNIQUES

(75) Inventors: Ram Keralapura, San Jose, CA (US);
Guowu Xie, Riverside, CA (US);
Marios Iliofotou, Sunnyvale, CA (US)

(73) Assignee: Narus, Inc., Sunnyvale, CA (US)

( * ) Notice: Subject to any disclaimer, the term of this patent is extended or adjusted under 35 U.S.C. 154(b) by 350 days.

(21) Appl. No.: 13/160,418

(22) Filed: Jun. 14, 2011

(51) Int. Cl.
*G06F 15/18* (2006.01)
(52) U.S. Cl.
USPC .......................................... 706/12
(58) Field of Classification Search
None
See application file for complete search history.

(56) References Cited

U.S. PATENT DOCUMENTS

| | | | | |
|---|---|---|---|---|
| 6,003,029 | A * | 12/1999 | Agrawal et al. ........................ 1/1 |
| 6,141,686 | A * | 10/2000 | Jackowski et al. ............. 709/224 |
| 7,944,822 | B1 * | 5/2011 | Nucci et al. .................... 370/229 |
| 2006/0112039 | A1 * | 5/2006 | Wang ............................... 706/20 |
| 2007/0192863 | A1 * | 8/2007 | Kapoor et al. .................. 726/23 |
| 2007/0271278 | A1 * | 11/2007 | Acharya ........................ 707/100 |
| 2008/0021897 | A1 * | 1/2008 | Lepre ................................ 707/6 |
| 2008/0082468 | A1 * | 4/2008 | Long et al. ...................... 706/12 |
| 2010/0124182 | A1 * | 5/2010 | Han et al. ....................... 370/253 |
| 2010/0332475 | A1 * | 12/2010 | Birdwell et al. ............... 707/737 |
| 2011/0040706 | A1 * | 2/2011 | Sen et al. ......................... 706/12 |
| 2011/0228744 | A1 * | 9/2011 | Cai et al. ........................ 370/331 |
| 2012/0047096 | A1 * | 2/2012 | Duffield et al. ................. 706/12 |

OTHER PUBLICATIONS

Fern et al, Random Projection for High Dimensional Data Clustering: A Cluster Ensemble Approach, 2003.*
Kriegel et al, A Generic Framework for Efficient Subspace Clustering of High-Dimensional Data, 2005.*
Parsons et al, Subspace Clustering for High Dimensional Data, 2004.*
Ng et al, Projective Clustering by Histograms, 2005.*

* cited by examiner

*Primary Examiner* — Jeffrey A Gaffin
*Assistant Examiner* — Mikayla Chubb
(74) *Attorney, Agent, or Firm* — Fernandez & Associates, LLP

(57) ABSTRACT

Embodiments of the invention provide a method, system, and computer readable medium for classifying network traffic based on application signatures generated during a training phase using a modified subspace clustering scheme based on feature vectors extracted from network flows in a training set generated by a particular application and applying the signatures to a new feature vector extracted in real-time from current network data. The newly extracted feature vector is projected into the subspaces and compared with the signatures.

27 Claims, 6 Drawing Sheets

Training Set 301 → 303 Projected Training Set → Feature Vector 302

| | Feature 1 | Feature 2 | Feature 3 | Feature 4 |
|---|---|---|---|---|
| 1 | 0.1 | 0 | 0.7 | 0.5 |
| 2 | 0.1 | 0.1 | 0.7 | 0.2 |
| 3 | 0.1 | 0.8 | 0.5 | 0.11 |
| 4 | 0.1 | 0.9 | 0.5 | 0.1 |
| 5 | 0.9 | 0.3 | 0.5 | 0.4 |

Step 1: Clustering at each dimension

| | Feature 1 | Feature 2 | Feature 3 | Feature 4 |
|---|---|---|---|---|
| 1 | 0.1 | 0 | 0.7 | 0.5 |
| 2 | 0.1 | 0.1 | 0.7  305 | 0.2 |
| 3 | 0.1 | 0.8 | | 0.11 |
| 4 | 0.1  304 | 0.9 | | 0.1  307 |
| 5 | 0.9 | 0.3 | 306 | 0.4 |

Step 2: Merge base clusters to form signature subspaces subspace: {1,3}

| | Feature 1 | Feature 2 | Feature 3 | Feature 4 |
|---|---|---|---|---|
| 1 | 0.1 | 0 | 0.7 | 0.5 |
| 2 | 0.1  304a | 0.1 | 0.7  305 | 0.2 |
| 3 | 0.1 | 0.8 | | 0.11 |
| 4 | 0.1  304b | 0.9 | 306a | 0.1  307 |
| 5 | 0.9 | 0.3 | | 0.4 | subspace: {1,3,4}

FIG. 3A

NETWORK TRAFFIC CLASSIFICATION USING SUBSPACE CLUSTERING TECHNIQUES

BACKGROUND OF THE INVENTION

1. Field of the Invention

The present invention relates to computers and computer networks. More particularly, the invention relates to classifying network traffic in the computer network.

2. Background of the Related Art

Identifying the flows generated by different application-layer protocols is of major interest for network operators. For Internet service providers (ISPs), identifying traffic allows them to differentiate the QoS (quality of service) for different types of applications, such as voice applications and video applications. Moreover, it enables them to control high-bandwidth and non-interactive application, such as peer-to-peer (P2P) applications. For enterprise networks, it is very important for administrators to know activities on their network, such as services that users are running, the application dominating network traffic, etc. Traffic classification is also important for securing the network. In fact, even traditional protocols are often used as means to control attacks, such as the use of IRC (Internet Relay Chat) to mange the C&C (command and control) nodes for botnets. Overall, traffic classification is the first step in building any kind of intelligence on a network.

Despite the significant research efforts for solving the network traffic classification problem, many deployed solutions rely heavily on payload and deep packet inspection (DPI) techniques. Payload-based techniques fail to classify encrypted traffic, and require consistent maintenance and updating of signatures, which is an expensive and time consuming process. In addition, it is often desirable to classify traffic that does not contain any payload and is summarized in the form of flow records or packet headers. At the same time, many applications, such as peer-to-peer (P2P), often randomize their ports, thus rendering port-based classification unreliable.

Throughout this disclosure, the term "flow" refers to a sequence of packets from a source node to a destination node in the network. Generally, a flow is represented by a 5-tuple of <source IP address, destination IP address, source port, destination port, protocol>. In particular, the protocol in the 5-tuple refers to a layer 4 (i.e., transport layer) protocol, such as TCP, UDP, ICMP, etc. Further, the terms "application" and/or "application class" refer to a layer 7 (i.e., application-layer) protocol with a distinct documented behavior in terms of communication exchanges, control packets, etc. Examples of such application include HTTP, SMTP, MSN, BitTorent, Gnutella, POP3, MSN, EDonkey, Telnet, Samba, Yahoo im, etc. Moreover, the term "application" may be referred to as the label or the class of the flow depending on the context.

SUMMARY

In general, in one aspect, the invention relates to a method for classifying network traffic in a network. The method includes (1) generating, by a processor of a computer system during a training phase, a plurality of signatures of an application executing in the network, comprising (i) obtaining, from the network traffic, a plurality of flows generated by the application to form a training set of the application, (ii) extracting, based on a first pre-determined criterion, a plurality of feature vectors each from a flow in the training set, the plurality of feature vectors corresponding to a plurality of nodes in a N-dimensional space having N dimensions where N represents a count of feature elements in each of the plurality of feature vectors, (iii) determining, based on a second pre-determined criterion, a plurality of subspace clusters each contained in a corresponding subspace in a plurality of subspaces of the N-dimensional space and representing a portion of the plurality of nodes projected into the corresponding subspace using a subspace projection mapping, wherein the subspace projection mapping maps a feature vector in the N-dimensional space to a sub-vector in the corresponding subspace having a subset of the N dimensions, wherein the sub-vector corresponds to a subspace node in the corresponding subspace and comprises a portion of the feature elements in the feature vector corresponding to the subset of the N dimensions, and (iv) including, in each of the plurality of signatures, one of the plurality of the subspaces and a corresponding subspace cluster, and (2) classifying, by the processor, a new flow obtained from the network traffic, comprising (i) extracting, based on the first pre-determined criterion, a new feature vector from the new flow, (ii) projecting, using the subspace projection mapping, the new feature vector into each of the plurality of subspaces to identify a corresponding subspace node in each of the plurality of subspaces, (iii) comparing, based on a third pre-determined criterion and in each of the plurality of subspaces, a subspace cluster contained therein and the corresponding subspace node to generate a result comprising a matched subspace cluster from the plurality of subspace clusters that is contained in a matched subspace of the plurality of subspaces, and (iv) determining, based on the result, the new flow as being generated by the application.

In general, in one aspect, the invention relates to a system for classifying network traffic in a network. The system includes (1) a hardware processor, (2) a signature generator executing on the hardware processor and configured to generate, during a training phase, a plurality of signatures of an application executing in the network by (i) obtaining, from the network traffic, a plurality of flows generated by the application to form a training set of the application, (ii) extracting, based on a first pre-determined criterion, a plurality of feature vectors each from a flow in the training set, the plurality of feature vectors corresponding to a plurality of nodes in a N-dimensional space having N dimensions where N represents a count of feature elements in each of the plurality of feature vectors, (iii) determining, based on a second pre-determined criterion, a plurality of subspace clusters each contained in a corresponding subspace in a plurality of subspaces of the N-dimensional space and representing a portion of the plurality of nodes projected into the corresponding subspace using a subspace projection mapping, wherein the subspace projection mapping maps a feature vector in the N-dimensional space to a sub-vector in the corresponding subspace having a subset of the N dimensions, wherein the sub-vector corresponds to a subspace node in the corresponding subspace and comprises a portion of the feature elements in the feature vector corresponding to the subset of the N dimensions, and (iv) including, in each of the plurality of signatures, one of the plurality of the subspaces and a corresponding subspace cluster, and (3) a classifier executing on the hardware processor and configured to classify a new flow obtained from the network traffic by (i) extracting, based on the first pre-determined criterion, a new feature vector from the new flow, (ii) projecting, using the subspace projection mapping, the new feature vector into each of the plurality of subspaces to identify a corresponding subspace node in each of the plurality of subspaces, (iii) comparing, based on a third pre-determined criterion and in each of the plurality of subspaces, a subspace cluster contained therein and the corresponding subspace node to generate a result comprising a matched subspace cluster from the plurality of subspace clusters that is contained in a matched subspace of the plurality of subspaces, and (iv) determining, based on the result, the new flow as being generated by the application.

In general, in one aspect, the invention relates to a non-transitory computer readable medium storing instructions for classifying network traffic in a network. The instructions when executed by a processor of a computer includes functionality for (i) generating, during a training phase, a plurality of signatures of an application executing in the network by (i) obtaining, from the network traffic, a plurality of flows generated by the application to form a training set of the application, (ii) extracting, based on a first pre-determined criterion, a plurality of feature vectors each from a flow in the training set, the plurality of feature vectors corresponding to a plurality of nodes in a N-dimensional space having N dimensions where N represents a count of feature elements in each of the plurality of feature vectors, (iii) determining, based on a second pre-determined criterion, a plurality of subspace clusters each contained in a corresponding subspace in a plurality of subspaces of the N-dimensional space and representing a portion of the plurality of nodes projected into the corresponding subspace using a subspace projection mapping, wherein the subspace projection mapping maps a feature vector in the N-dimensional space to a sub-vector in the corresponding subspace having a subset of the N dimensions, wherein the sub-vector corresponds to a subspace node in the corresponding subspace and comprises a portion of the feature elements in the feature vector corresponding to the subset of the N dimensions, and (iv) including, in each of the plurality of signatures, one of the plurality of the subspaces and a corresponding subspace cluster, and (2) classifying a new flow obtained from the network traffic by (i) extracting, based on the first pre-determined criterion, a new feature vector from the new flow, (ii) projecting, using the subspace projection mapping, the new feature vector into each of the plurality of subspaces to identify a corresponding subspace node in each of the plurality of subspaces, (iii) comparing, based on a third pre-determined criterion and in each of the plurality of subspaces, a subspace cluster contained therein and the corresponding subspace node to generate a result comprising a matched subspace cluster from the plurality of subspace clusters that is contained in a matched subspace of the plurality of subspaces, and (iv) determining, based on the result, the new flow as being generated by the application.

Other aspects and advantages of the invention will be apparent from the following description and the appended claims.

BRIEF DESCRIPTION OF DRAWINGS

FIGS. 3A and 3B show an example according to aspects of the invention.

DETAILED DESCRIPTION

Figure 1:
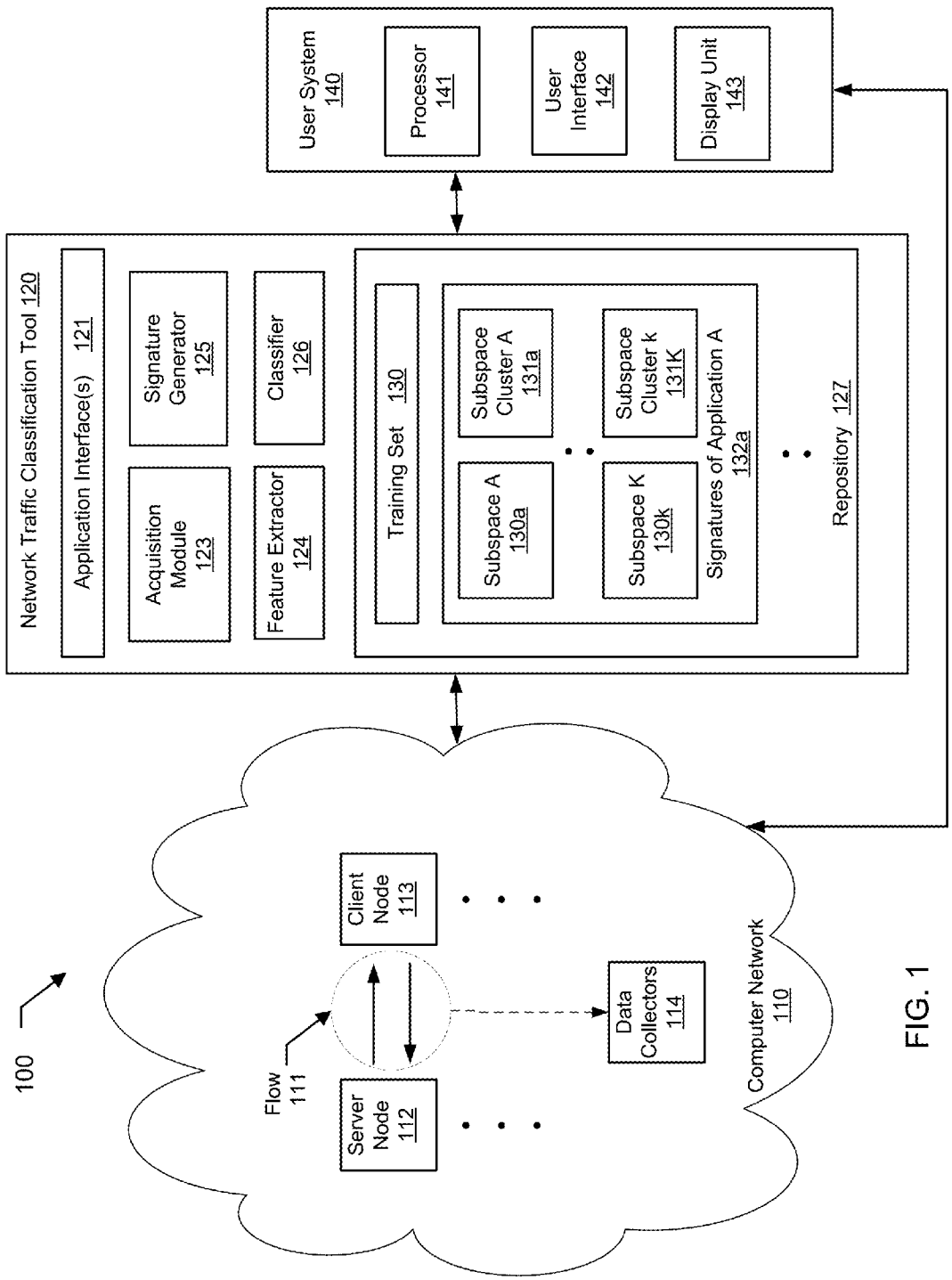
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a method, system, and computer readable medium for network traffic classification. Specifically, for each incoming flow observed on a network, a classifier maps it to the application-layer protocol from which the flow is generated. Generally, the term "flow" may refer to a unidirectional flow or a bi-directional flow. A unidirectional flow includes only data packets traveling in one direction, either from server node to client node or vice versa. A bi-directional flow includes data packets traveling in both directions from server node to client node and vice versa. A bi-directional flow may be considered as a combination of two unidirectional flows traveling in opposite directions. In one or more embodiments, a bi-directional flow is classified by classifying the two unidirectional flows separately. Classifying the network traffic based on unidirectional flows provides a solution to the routing asymmetry at the Internet backbone, where one direction of a flow is often missing. Using unidirectional flows is important for allowing the classifier to be deployed anywhere in the network.

FIG. 1 shows a diagram of a system (100) for network traffic classification using subspace clustering techniques in accordance with one or more embodiments. The system (100) includes a network traffic classification tool (120), a user system (140), and a computer network (110). The network traffic classification tool (120) includes data repository (127), one or more application interfaces (121), acquisition module (123), feature extractor (124), signature generator (125), and classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the network (110). As shown in FIG. 1, the server node (112) and client node (113) communicate with each other by exchanging data packets forming a flow (111), which includes two unidirectional flows represented by two arrows. Although shown as a bi-directional flow in the example depicted in FIG. 1, the flow (111) may also be a single unidirectional flow in other examples. In one or more embodiments, the server node (112) and the client node (113) exchange data packets in the flow (111) as a result of an application executing on the server node (112) and the client node (113). In this context, the flow (11) is referred to as being generated by the application executing on the server node (112) and client node (113). In one or more embodiments, certain device(s) (e.g., data collectors (114)) within the computer network (110) may be configured to collect network data (e.g., flow (111)) for providing to the network traffic classification tool (120). Each of these components is described below. One of ordinary skill in the art will appreciate that embodiments are not limited to the configuration shown in FIG. 1.

In one or more embodiments of the invention, the network traffic classification tool (120) is configured to interact with the computer network (110) using one or more of the application interface(s) (121). The application interface (121) may be configured to receive data (e.g., flow (111)) from the computer network (110) and/or store received data to the data repository (127). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic classification tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic classification tool (120). The user may include, but is not limited to, an individual, a group, an organization, or some other entity having authority and/or responsibility to access the network traffic classification tool (120). Specifically, the context of the term "user" here is distinct from that of a user of the computer network (110). The user system (140) may be, or may contain a form of, an internet-based communication device that is capable of communicating with the application interface (121) of the network traffic classification tool (120). Alternatively, the network traffic classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic classification tool (120) (e.g., report, alert, etc.).

As shown, communication links are provided between the network traffic classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network traffic classification tool (120), the user system (140), and the communication links may be part of the computer network (110).

In one or more embodiments, a central processing unit (CPU, not shown) of the network traffic classification tool (120) is configured to execute instructions to operate the components of the network traffic classification tool (120). In one or more embodiments, the memory (not shown) of the network traffic classification tool (120) is configured to store software instructions for analyzing the network trace to extract features, generating classification signatures, and classifying new flows captured from the network traffic to identify the application(s) that generates the new flows. The memory may be one of a variety of memory devices, including but not limited to random access memory (RAM), read-only memory (ROM), cache memory, and flash memory. The memory may be further configured to serve as back-up storage for information stored in the data repository (127).

The network traffic classification tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic classification tool (120) is configured to obtain and store data in the data repository (127). In one or more embodiments, the data repository (127) is a persistent storage device (or set of devices) and is configured to receive data from the computer network (110) using the application interface (121). The data repository (127) is also configured to deliver working data to, and receive working data from, the acquisition module (123), feature extractor (124), signature generator (125), and classifier (126). The data repository (127) may be a data store (e.g., a database, a file system, one or more data structures configured in a memory, some other medium for storing data, or any suitable combination thereof), which may include information (e.g., training set (130), signatures of application A (132a), etc.) related to the network traffic classification. The data repository (127) may be a device internal to the network traffic classification tool (120). Alternatively, the data repository (127) may be an external storage device operatively connected to the network traffic classification tool (120).

In one or more embodiments, the network traffic classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network traffic classification tool (120) is configured to support various data formats provided by the user system (140).

In one or more embodiments, the network traffic classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple). For example, such network trace, or information extracted therefrom, may then be stored in the repository (127) as training set (130), etc.

In one or more embodiments, a flow parser (e.g., acquisition module (123) in conjunction with data collectors (114) in FIG. 1) reconstructs (e.g., eliminates redundant packets, collates packets into a correct sequence, etc.) all the packets that correspond to the same traffic flow identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments of the invention, the network traffic classification tool (120) includes the feature extractor (124) that is configured to extract, from each flow (e.g., flow (111)) captured from the network traffic data, a number of feature elements each representing a measure of communication activity between the source and destination of the flow. Example feature elements includes statistical measure of a packet count, a packet arrival time gap, a packet payload size, TCP/UDP flag count, out-of-sequence packet count, port numbers used, segment size, etc. Some of such examples are listed in TABLE 1 for reference purpose without limiting the scope of the invention.

TABLE 1

| Feature | Definition |
| --- | --- |
| pkts | The total number or packets 11 the uni-directional flow |
| bytes | The sum of the bytes of each packet |
| pay_pkts | The number of packets containing non empty payload |
| duration | The arrival time gap between the first and last packets |
| bps | Bytes per second is the ratio of total bytes over duration |
| pay_size_i | The payload size of the packets i |
| IAT_i | The inter arrival time between the packets i and i + 1 |
| max_IAT | The maximum of IAT |
| min_IAT | The minimun of IAT |
| avg_IAT | The average of IAT |
| std_IAT | The standard deviation of IAT |
| max_pay_size | The maximum of payload size |
| min_pay_size | The minimum of payload size |
| avg_pay_size | The average of payload size |
| std_pay_size | The standard deviation of payload size |

In one or more embodiments, types (e.g., pkts, bytes, etc. as listed in TABLE 1) of feature elements extracted from the feature extractor (124) are pre-configured and are the same for each flow (e.g., flow (111)) processed by the feature extractor (124) for feature extraction. Specifically, such pre-determined feature element types are the same for flows generated from different applications. Generally, different feature elements may be effective for classifying different applications. In one or more embodiments, a large number (e.g., tens, hundreds, etc.) of types of feature elements are used. Such extracted feature elements, of the pre-configured types, form a feature vector for each flow processed by the feature extractor (124). For example, the feature extractor (124) may be configured to extract N number of types of feature elements from each flow. Such N types of feature elements form an N-dimensional space where each extracted feature vector is represented by a node. As noted above, the N dimensions are the same types of feature elements for different applications. Accordingly, feature vectors extracted from flows generated by different applications are represented as nodes in this single N-dimensional space. Throughout this disclosure, the term "feature" may refer to feature element(s) and/or a feature vector depending on the context. Further, the terms "feature element" and "dimension" may be used interchangeably depending on the context.

In one or more embodiments of the invention, the network traffic classification tool (120) includes the signature generator (125) that is configured to generate a signature set for each of the applications executing in the network (110). An example signature set is shown in FIG. 1 as the signatures of application A (132a). In one or embodiments, the signatures of application A (132a) is generated in a training phase using machine learning algorithms to process a set of representative flows generated by the application A (not shown). Such set of representative flows is referred to as a training set. For example, the signatures of application A (132a) may be generated from the training set (130) that includes representative flows generated by the application A (not shown). In one or more embodiments, flows (not shown) captured from the network (110) may be screened to identify those being generated by the application A for including in the training set (130). In one or more embodiments, such screening may be performed by analyzing the captured flows using deep packet inspection (DPI) methods to select the ones generated by the application A. In one or more embodiments, such screening may be performed by limiting the captured flows to those from and towards well known servers (e.g., the local DNS and SMTP server) known to be executing the application A (e.g., DNS and SMTP, respectively). In one or more embodiments, such screening may be performed by limiting the captured flows to those from and towards well known servers known to be used by the application A.

In one or more embodiments, each flow (not shown) in the training set (130) may be processed by the feature extractor (124) to extract a feature vector having N feature elements and corresponding to a node in the aforementioned N-dimensional space. In one or more embodiments, feature vectors extracted from flows in the training set (130) correspond to nodes (referred to as feature vector nodes of application A) in the N-dimensional space and are also stored in the training set (130).

In one or more embodiments, the signature generator (125) is configured to generate the signatures of application A (132a) using subspace clustering techniques. In particular, a subspace (e.g., subspace A (130a), subspace K (130k)) of the aforementioned N-dimensional space is a space formed by a fraction of all dimensions of the N-dimensional space. Mathematically, there are $2^N$ subspaces for the N-dimensional space. In one or more embodiments, the signature generator (125) is configured to select, by applying a subspace clustering algorithm (e.g., the FIRES algorithm known to those skilled in the art or an algorithm described in reference to FIG. 2 below) to feature vector nodes of application A in the training set (130), a portion of the $2^N$ subspaces as signature subspaces deemed important for classifying the application A. As shown in FIG. 1, the signature subspaces include subspace A (130a), subspace K (130k), etc.

In one or more embodiments, the signature generator (125) is configured to project, using a subspace projection mapping, the feature vector nodes of application A in the N-dimensional space into each of the signature subspaces subspace (e.g., subspace A (130a), subspace K (130k), etc.) to identify a corresponding set of subspace nodes in each of the signature subspaces subspace (e.g., subspace A (130a), subspace K (130k), etc.). In particular, the subspace projection mapping maps a feature vector in the N-dimensional space to a subvector in the corresponding signature subspace (e.g., subspace A (130a), subspace K (130k), etc.), wherein the subvector corresponds to a subspace node in the corresponding signature subspace (e.g., subspace A (130a), subspace K (130k), etc.) and includes a portion of the N feature elements in the feature vector corresponding to the subset of the N dimensions forming the corresponding signature subspace (e.g., subspace A (130a), subspace K (130k), etc.). Throughout this disclosure, the terms "flow", "feature vector", "subvector", "feature vector node", and "subspace node" may refer to each other depending on the context.

In one or more embodiments, the signature generator (125) is configured to select, using a clustering algorithm (e.g., the DBSCAN algorithm known to those skilled in the art), a portion of the corresponding set of subspace nodes in each of the signature subspaces (e.g., subspace A (130a), subspace K (130k), etc.) as the subspace cluster (e.g., subspace cluster A (131a), subspace cluster K (131k), etc.) contained therein. In one or more embodiments, the signature generator (125) is configured to include pairs of subspace and contained subspace cluster (e.g., <subspace A (130a), subspace cluster A (131a)>, <subspace K (130k), subspace cluster K (131k)>, etc.) in the signatures of application A (132a).

Mathematically, a set of flows in the training set (130) may be represented as F that belong to (i.e., generated by) the same application A. A full set of feature element types may be represented as S. Accordingly, each flow f in F is a $|S|$-dimensional vector of numerical values where $|S|$ represents a count of feature element types in S. Based on F and S as input to the signature generator (125), in conjunction with the feature extractor (124), the output from the signature generator (125) includes one or more pairs of subspace cluster and subspace $(F_i, S_i)$, such that $F_i \epsilon F$ and $S_i \epsilon S$. For each flow corresponding to a subspace node in $F_i$, only relevant types of feature elements in $S_i$ are retained to identify the subspace node. This essentially projects the initial $|S|$-dimensional feature vector to a $|S_i|$-dimensional subspace vector (i.e., subvector) with $|S_i| \epsilon (1 \ldots |S|)$. Generally, a subspace may contain more than one subspace cluster including different flows. That is, when $S_x = S_y$, then $F_x \cap F_y = 0$. However, the same flow can belong to clusters in different subspaces. That is, when $F_x \cap F_y \neq 0$ then $S_x \neq S_y$ must holds. As described above, a signature in the signatures of application A (132a) is represented by a pair of subspace cluster and subspace $(F_i, S_i)$ returned by the signature generator (125) based on the aforementioned subspace clustering algorithm, subspace projection mapping, and clustering algorithm. Based on functionalities of these algorithms, for each signature $(F_i, S_i)$, $F_i$ corresponds to a subset of flows in the training set (130) that are close to each other based on a pre-determined cluster criterion when projected into the subspace $S_i$. Additional details of the aforementioned subspace clustering algorithm, subspace projection mapping, and clustering algorithm are described in reference to FIG. 2 below.

In one or more embodiments of the invention, the network traffic classification tool (120) includes the classifier (126) that is configured to classify a new flow (e.g., flow (111)) obtained from the network traffic. Specifically, a new feature vector is extracted from the new flow by the feature extractor (124) and projected, by the classifier (126) using the aforementioned subspace projection mapping, into each of the signature subspaces (e.g., subspace A (130a), subspace K (130k), etc.) to identify a corresponding subspace node in each of the signature subspaces (e.g., subspace A (130a), subspace K (130k), etc.). Accordingly, the projected subspace node in each of the plurality of subspaces is compared with a subspace cluster of application A (e.g., subspace cluster A (131a), subspace cluster K (131k), etc.) contained therein to generate a result. When the projected subspace node in a particular subspace is determined to be sufficiently close (e.g., based on a pre-determined distance measure) to a particular subspace cluster of application A, the particular subspace cluster is identified as a matched subspace cluster and the particular subspace is identified as a matched subspace. When the matched subspace meets a pre-determined cardinality criterion and the distance measure is within a pre-determined range, the new flow (e.g., flow (111)) is classified as being generated by the application A. Additional details of comparing the new flow to the signatures of application A (132a) are described in reference to FIG. 2 below.

While specific components are depicted and/or described for use in the units and/or modules of the network traffic classification tool (120), it will be appreciated that a variety of components with various functions may be used to provide the formatting, processing, utility and coordination functions necessary to modify various working data used by the network traffic classification tool (120). The components may have combined functionalities and may be implemented as software, hardware, firmware, or combinations thereof.

Figure 2:
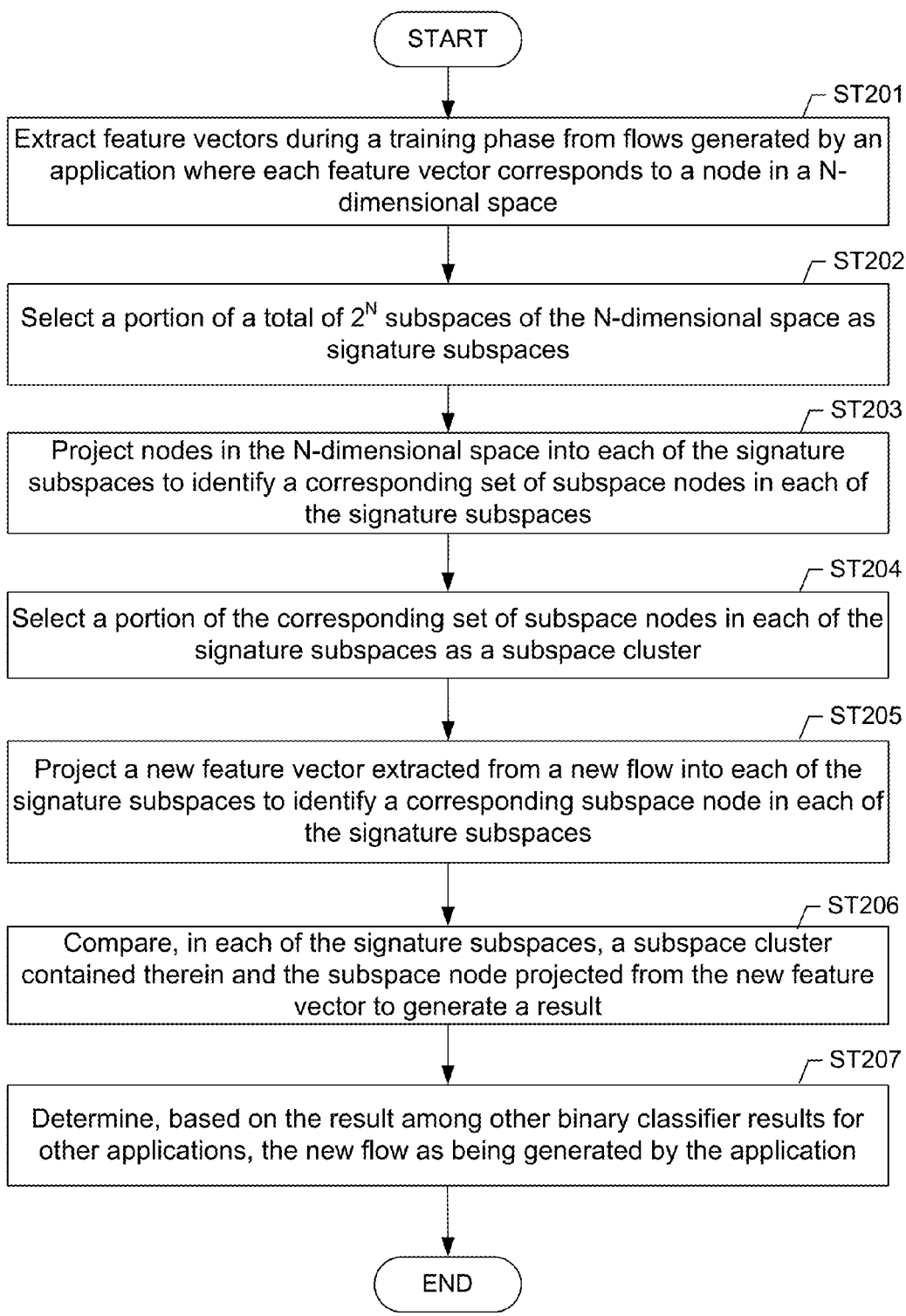
FIG. 2 shows a method flow chart according to aspects of the invention.

FIG. 2 depicts a method flowchart of methods in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 3A. In one or more embodiments of the invention, the method depicted in FIG. 2 may be practiced using system (100) described with respect to FIG. 1 above.

Generally, the method depicted in FIG. 2 is used to classify network traffic in a network by first generating, during a training phase, a set of signatures of an application executing in the network, then determining a new flow as being generated by the application by comparing features of the new flow to the set of signatures.

Initially in Step 201, during a training phase, a collection of flows generated by the application are captured to form a training set of the application. For each flow in the training set, a feature vector is extracted based on pre-determined types of feature elements representing various statistical measures of packet count, packet arrival time gap, and/or packet payload size in the flow. As noted above, example types of the feature elements in each feature vector are listed in TABLE 1 above. In one or more embodiments, the same pre-determined types of feature elements are used to classify all applications executing in the network for consistency. In particular, N represents a count of feature elements in each feature vector extracted based on the pre-determined types. In one or more embodiments, each feature vector corresponds to a node in an N-dimensional space. In this context, each flow from which the feature vector is extracted also corresponds to the same node in the N-dimensional space.

Mathematically, there are total of $2^N$ subspaces of the N-dimensional space where each subspace includes a subset of the N dimensions. For each subspace, a subspace projection mapping maps a feature vector in the N-dimensional space to a sub-vector that corresponds to a subspace node in the subspace and consists of a subset of the feature elements in the feature vector corresponding to the subset of the N dimensions. The subspace projection mappings for all $2^N$ subspaces are collectively referred to as the subspace projection mapping.

Using the subspace projection mapping, the collection of nodes representing the training set in the N-dimensional space is projected to a set of subspace nodes (referred to as the projected training set) in each of the subspaces. In one or more embodiments, each of the aforementioned set of signatures of the application is a subspace cluster contained in a particular subspace (referred to as a signature subspace) and representing a portion of the set of projected subspace nodes that are close to each other in the corresponding subspace. In one or more embodiments, the set of signatures are generated in a two step process of (1) identifying signature subspaces from the total of $2^N$ subspaces and (2) identifying subspace clusters contained in all signature subspaces. Generally, the signature subspaces are considered relevant subspaces in which the application is best represented. Additional details of generating the subspace clusters for the signatures of the application are described in Steps 202-204 below.

In Step 202, a portion of a total of $2^N$ subspaces of the N-dimensional space are selected as the signature subspaces. In one or more embodiments, the signature subspaces are selected by a bottom-up approach described below. As noted above, F represents a set of flows in the training set while S represents a full set of feature element types. In the bottom up approach, one or more clusters are identified by first analyzing, using clustering algorithms known to those skilled in the art (e.g., k-means clustering algorithm); each projected training set in each of the N 1-dimensional (1D) subspaces corresponding to the N dimensions or N different types of feature elements. These subspace clusters in 1D subspace are referred to as base clusters. Each 1D subspace corresponds to, and is represented by, a feature element S in the set S. In this context, generating the base clusters is referred to as clustering all the flows of F in each 1D subspace S in the set S. The second step in selecting the signature subspace includes merging base clusters from different dimensions to identify higher dimensional subspaces $S_i$. In order for two base-clusters to be merged, they are to have a large number of common flows f in F. Merging pairs of base-cluster results in subspaces of dimensionality d in $(2, \ldots, |S|)$.

An example of merging base clusters to identify higher dimensional signature subspaces to generate signatures for application X is described in reference to FIG. 3A. As shown in FIG. 3A, the training set (301) (i.e., F) has five flows (i.e., flow 1 through flow 5) represented by feature vectors (e.g., feature vector (302)) each having four numerical features (i.e., feature 1 through feature 4). Specifically, each row (i.e., row 1 through row 5) in the training set (301) represents a feature vector (e.g., feature vector (302)) while each column represents a projected training set (i.e., projected training set (303)) in a corresponding 1D subspace. Each projected training set and corresponding 1D subspace are referred to based on the feature element forming the 1D subspace. For example, the projected training set (303) is referred to as the projected training set in the feature 2 1D subspace.

In step 1, clustering algorithm (e.g., k-means clustering algorithm) is applied at each individual dimension to identify base cluster 1 (304) in the feature 1 1D subspace, base cluster 2 (305) and base cluster 3 (306) in the feature 3 1D subspace, and base cluster 4 (307) in the feature 4 1D subspace. In particular, there is no base cluster identified in the feature 2 1D subspace.

In step 2, base clusters are merged to form signature subspaces. In one or more embodiments, features that do not have any base-clusters as well as features that do not merge their base-clusters to form signature subspaces are not used in the signatures. Said in other words, features that do not capture any statistically dominant characteristics of the application are removed. As shown in FIG. 3A, base cluster (304) is divided into base cluster (304a) and base cluster (304b) for merging with base cluster (305) and base cluster (305a), respectively. The base cluster (305) is divided to generate the base cluster (305a) for merging with base cluster (204a) and base cluster (307). Further as shown, the subspace cluster (308) merged from base clusters (304a) and (305) is contained in a higher dimensional subspace having feature 1 and feature 3 as its dimensions and referred to as the signature subspace $\{1, 3\}$. Similarly, the subspace cluster (309) merged from base clusters (304b), (306a), and (307) is contained in another higher dimensional subspace having feature 1, feature 3, and feature 4 as its dimensions and referred to as the signature subspace $\{1, 3, 4\}$. Specifically, the subspace cluster (308) includes a merged subspace node (0.1, 0.7) in the signature subspace $\{1, 3\}$ while the subspace cluster (309) includes two subspace nodes (0.1, 0.5, 0.11) and (0.1, 0.5, 0.1) in the signature subspace $\{1, 3, 4\}$.

In one or more embodiments, for two base clusters to be merged in step 2, the number of common flows in the two base clusters is required to be at least 50% of the number flows of the smaller of the two base-clusters. To further reduce the computation overhead, all the base clusters that are smaller than 0.5 times the average base cluster size are removed before performing step 2. In addition, a base cluster is divided (or split) into smaller base clusters during merging if and only if the new base-clusters are larger than 0.5 times the size of the average base-cluster.

In one or more embodiments, the Step 202 may also be performed using a subspace clustering algorithm known to those skilled in the art, such as the FIRES algorithm. Typically, prior art subspace clustering algorithm aims to identify subspace clusters each contained in one of the $2^N$ subspaces of the N-dimensional space. In the embodiments using a prior art subspace clustering algorithm, the subspace clusters identified by the prior art subspace clustering algorithm (e.g., FIRES algorithm) are discarded. Instead, the subspace containing the discarded subspace clusters are selected in Step 202 as the signature subspace used by Step 203 and 204 below. These selected signature subspaces are considered relevant subspaces for classifying the network traffic.

In Step 203, the training set is projected, using the subspace projection mapping, into the signature subspaces selected in Step 202 above to generate a projected training set in each of the signature subspaces. Said in mathematical terms, the flow set F is projected into each signature subspace $S_i$ to generate a projected training set $F_i$ for performing a second pass of clustering separate from any clustering performed in Step 202. As noted above, the clustering performed in Step 202 is for the purpose of selecting the signature subspaces while the resultant clusters in Step 202 are discarded once the signature subspaces are selected.

In Step 204, cluster algorithm is applied to each projected training set $F_i$ in each signature subspace $S_i$ to identify subspace clusters. Each such subspace cluster that meets a pre-determined criterion is identified as a signature of the application. In one or more embodiments, the pre-determined criterion may include a minimum cardinality (i.e., number of dimensions) of the signature subspace $S_i$, minimum nodes in the subspace cluster, maximum radius of a region of interest encompassing the subspace cluster, etc. The region of interest may also be referred to as the feasible region or the volume hull, and is described below.

As noted above, the signature subspaces are considered relevant subspaces in which the application is best represented. In addition, the region of interest is a portion of each signature subspace where most (if not all of) the flows generated by this application are likely to be projected. The region of interest is also referred to as the feasible region or volume hull. Generally, the region of interest is not unique. Said in other words, multiple hulls exist that include all clustered flows (i.e., in the subspace cluster) in the projected training set of each signature subspace described above. In one or more embodiments, a sphere-based hull is used to approximate the shape of a given subspace cluster. For example, the sphere-based hull may be a sphere with center at the centroid of the subspace cluster and radius equal to the maximum distance between the centroid and any subspace node belonging to the subspace cluster. In one or more embodiments, an axis-aligned ellipsoid-based hull is used to approximate the shape of a given subspace cluster. For example, the axis-aligned ellipsoid-based hull may be an ellipsoid with center at the centroid of the subspace cluster and radii equal to the absolute value of the difference between the centroid and the farthest subspace node in each dimension constituting the signature subspace. Generally, the sphere-based hull, axis-aligned ellipsoid-based hull, and/or other suitable hulls for a subspace cluster may be generated using algorithms known to those skilled in the art.

Figure 3B:
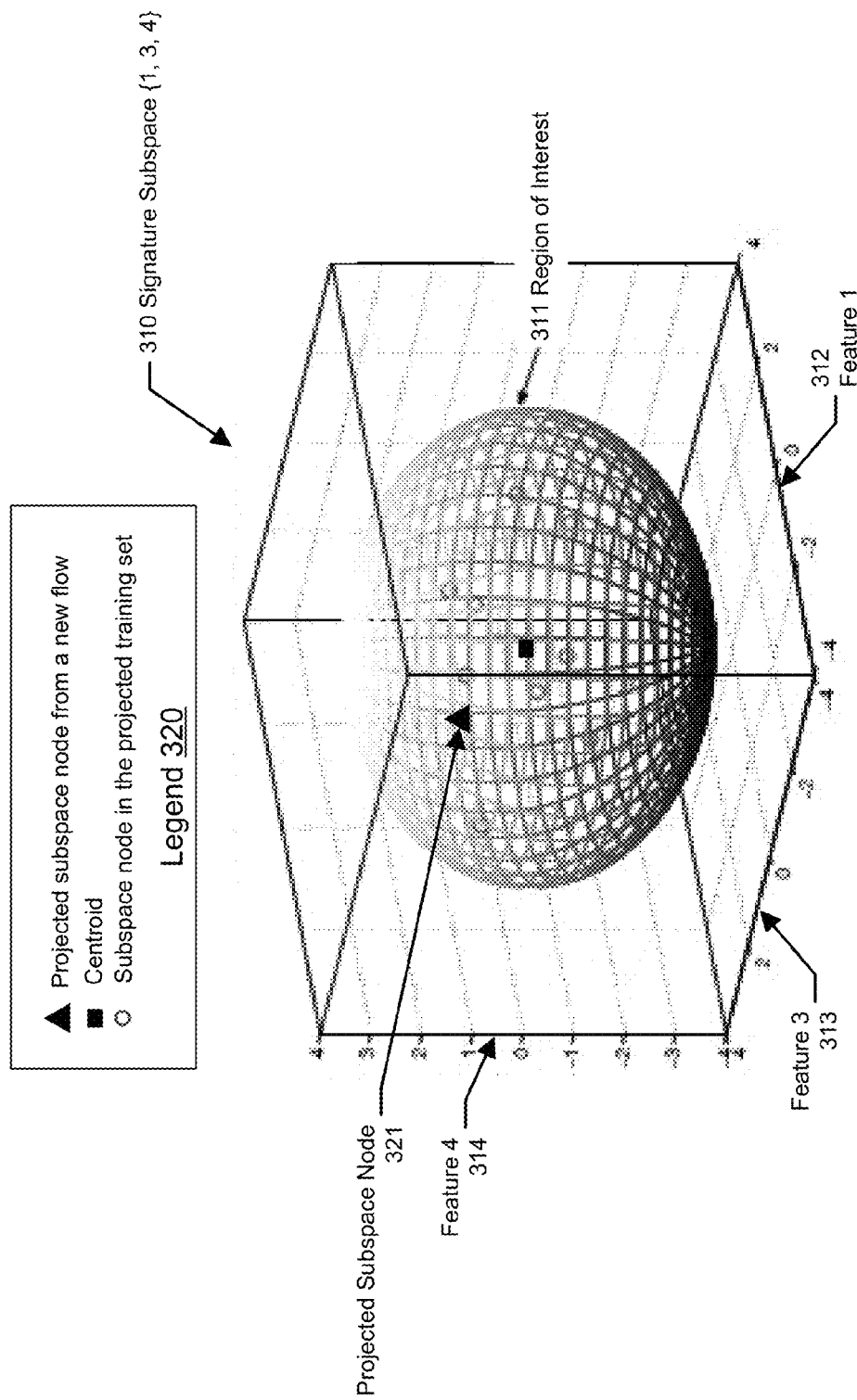

FIG. 3B shows an example region of interest (311) in the signature subspace (310) having feature 1 (312), feature 3 (313), and feature 4 (314) as the dimensions. For example, the signature subspace (310) may correspond to the signature subspace $\{1, 3, 4\}$ described in FIG. 3A above with the exception that the signature subspace $\{1, 3, 4\}$ is shown to include two projected subspace nodes in FIG. 3A while the signature subspace (310) is shown to include 10 subspace nodes in FIG. 3B. As shown in FIG. 3B, these 10 subspace nodes and a centroid of the signature subspace (310) are depicted according to the legend (320).

For example, an application signature is defined using two components: the signature subspace (310) and the region of interest (311) contained therein. Upon a new signature being generated, a corresponding binary classifier is created based on the signature subspace (310) and corresponding region of interest (311). When an incoming new flow is to be classified using the newly created binary classifier, the new flow is projected into the signature subspace (310) to determine if the projection (e.g., projected subspace node (321) shown in FIG. 3B) falls within its region of interest (311). If it does, the classification is labeled as TRUE and the new flow is determined to be generated by the application, otherwise the classification is labeled as FALSE and the new flow is determined to be not generated by the application.

Specifically in Step 205, the new feature vector extracted from the new flow is projected, using the subspace projection mapping, into each of the signature subspaces to identify a corresponding subspace node in each of the signature subspaces. Accordingly in Step 206, each projected subspace node from the new flow is compared, based on a pre-determined criterion and in each of the signature subspaces, a region of interest contained therein to generate a result. In one or more embodiments, the result includes one or more matched subspace cluster contained in one or more corresponding matched signature subspaces. In one or more embodiments, the pre-determined criterion requires that a distance measure in at least one matched signature subspace being less than a pre-determined threshold. For example, the distance measure may be the Euclidean distance between the projected subspace node from the new flow and the centroid of the region of interest. In another example, the distance measure may be the Euclidean distance between the projected subspace node from the new flow and the closet subspace node in the projected training set in the signature subspace. In one or more embodiments, the pre-determined criterion requires that a cardinality (i.e., number of dimensions) of at least one matched signature subspace exceeding a pre-determined threshold.

In Step 207, the new flow is determined, based on the result, as being generated by the application. Specifically, if the pre-determined criterion used for the comparison in Step 206 is met, the new flow is determined as being generated by the application. In one or more embodiments, each flow in the training set is associated with a particular port number configured by the application while the new flow is associated with a different port number configured by the application. For example, all flows in the training set may be generated by executing the application using a default port of the application, while the new flow is generated by the same application that is configured to execute using a different port than the default port. In one or more embodiments, each flow in the training set is associated with a particular service provider of the network or a particular geographical region while the new flow is associated with a different service provider of the network or a different geographical region.

In one or more embodiments, the set of signatures of an application corresponds to a set of binary classifiers with one binary classifier for each application signature in the set of signatures. Essentially, each signature is a binary classifier that reports match or no match when compared with a new flow. Further, multiple sets of binary classifiers of multiple application executing in the network are combined in one combined set of binary classifiers. Accordingly, a new flow that needs to be classified is tested for a match over all the signatures for all applications using all binary classifiers in the combined set of binary classifiers.

Assume that at a specific point in time, there are n binary classifiers, $X=\{x_1, x_2, \ldots, x_n\}$ in the combined set of binary classifiers. Any new flow that reaches the classifier is processed by each of the n binary classifiers. The outcome is an n-dimensional boolean vector $L=\{l_1, l_2, \ldots, l_n\}$ where the variable $l_i$ represents the label assigned by the binary classifier $x_i$ to the new flow, i.e., $l_i=1$ if and only if $x_i$ labels the flow TRUE, otherwise $l_i=0$. Since each binary classifier in the combined set of binary classifiers may be associated with a different application, an application name vector $M=\{m_1, m_2, \ldots, m_n\}$ is used in conjunction with the boolean vector L to describe the intermediate classification result, where the variable $m_i$ represents the application name associated with $x_i$. Let another n-dimensional vector $D=\{d_1, d_2, \ldots, d_n\}$ represents the aforementioned distance measure described in Step 206, where $d_i$ represents the distance measure between the projected subspace node from the new flow and the projected training set in the signature space associated with $x_i$. The final decision on whether the new flow should be labeled as a particular application name in M or labeled "Unknown" is made running the following algorithm steps (1) through (3) based on the vectors L, M, and D.

Algorithm step (1): For all signatures $l_j=1$ in L, select those that have $|S_j| \geq minDim$. Said in other words, matched signature subspaces with cardinality exceeding or equaling the pre-determined threshold minDim are selected, which are tracked in a response set $R=\{j\}$.

Algorithm step (2): If $|R|==0$, return the label as "Unknown." Else if $|R|==1$, return the label as M(k) where $\{k\}=R$. Else if $|R|>1$, from all the matched signature subspaces tracked in the response set R, select those with the highest dimension (i.e., cardinality) $|S_k|$ with $k \in R$ and track them in set B. Said in other words, matched signature subspace(s) with the highest cardinality is/are selected from multiple matched signature subspaces associated with different applications.

Algorithm step (3): If $|B|=1$, return the label as M(k) where {k}=B. Else, from all the matched signatures subspaces tracked in the set B, select the one (w) with the smaller distance measure and return the label as M(w). Said in other words, if more than one matched signature subspace associated with different applications are selected with the same highest cardinality, the one with smaller distance measure between the projected subspace node from the new flow and the projected training set in the signature subspace is selected.

Figure 4A:
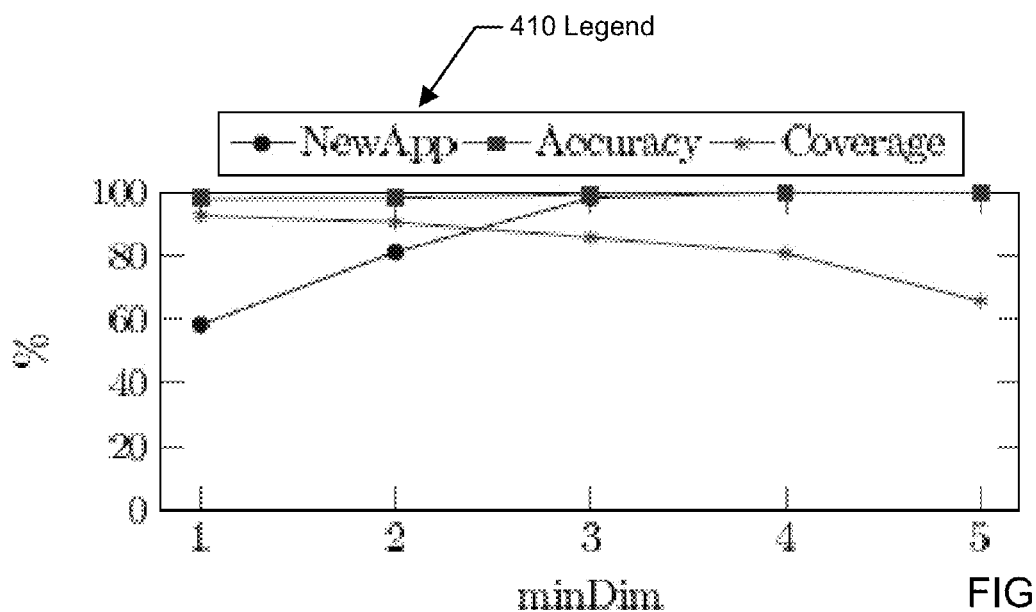
FIGS. 4A-4C show example results according to aspects of the invention.
Figure 4B:
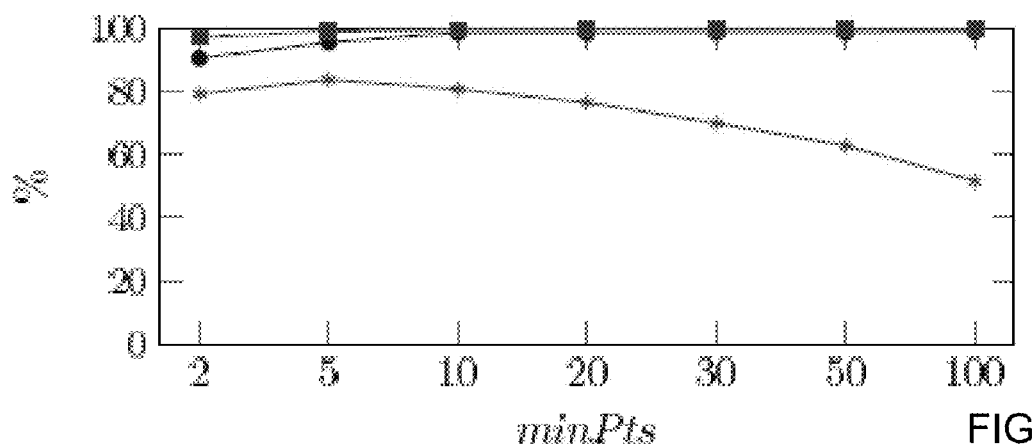
Figure 4C:
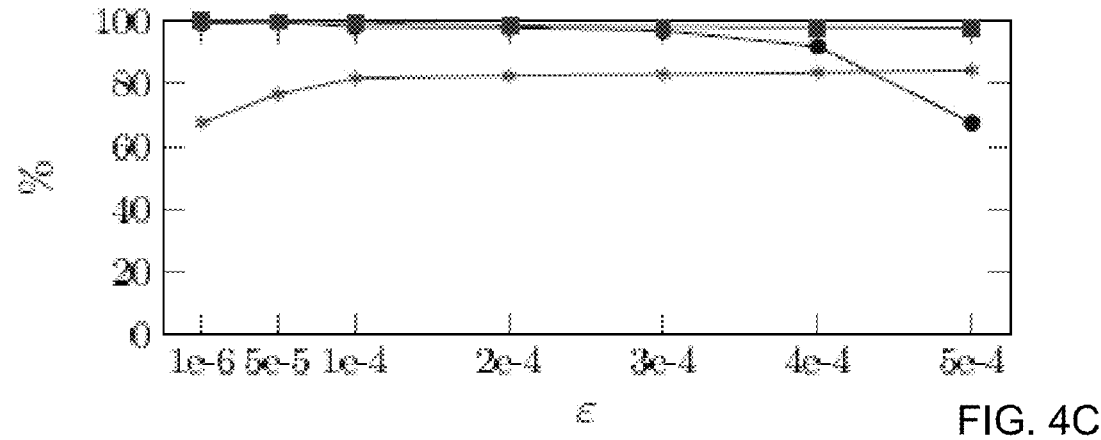

FIGS. 4A-4C show an example according to aspects of the invention. In particular, five full packet traces (headers and payload) from different ISPs were collected during a time period from 2005 to 2011. The ISPs are distributed across different geographic locations: three are in Asia, one in South America, and one in North America. All traces are collected from backbone links connecting client ISPs to their providers as well as peering links between ISPs. Overall, this collected data set cover a diverse set of network links, collected over different time periods, with different users, applications, and characteristics. Generally, classifying the collected data set involves classifiers that work with both TCP and UDP flows. Because the features of the two layer-4 protocols are different (e.g. TCP flags do not have any meaning in UDP), TCP and UDP applications are classified using different classifiers. FIGS. 4A-4C show the results using TCP classifier, which covers a larger set of protocols and significantly larger portion of the data (>85% of the collected data set) than UDP classifier in this collected data set. It is noted that UDP classifiers lead to qualitatively similar results and observations.

FIGS. 4A-4C show the accuracy, coverage, and average new application detection rate (denoted as NewApp in the legend (410) applicable to each of FIGS. 4A-4C) in classifying the collected data set when three configurable parameters minDim, minPts, and $\epsilon$ of the classifiers are varied. In particular, the accuracy is the number of flows that are labeled with a known application (instead of being labeled as "unknown") divided by the total number of flows that are classified. The accuracy is the number of correctly classified flows (as comparing to ground truth data based on deep packet inspection, well known servers, or well known ports) divided by total number of flows that are classified. The average new application detection rate is the number of flows correctly labeled as "unknown" divided by total number of flows that are generated by new applications that does not yet have signatures. Further, the parameter "minDim" is the minimum cardinality required for each signature subspace, the parameter "minPts" is the minimum number of subspace nodes required for each signature subspace, and the parameter $\epsilon$ is the maximum allowed Euclidean distance between any flows in each region of interest.

Although specific formats, structures, or partitions are used as examples in the foregoing description regarding the various components in the network traffic classification tool, user system, and computer network, one skilled in the art, with the benefit of this disclosure, would recognize that other formats or structures may also be used in the system, methods, and examples described without deviating from the spirit of the invention.

Figure 5:
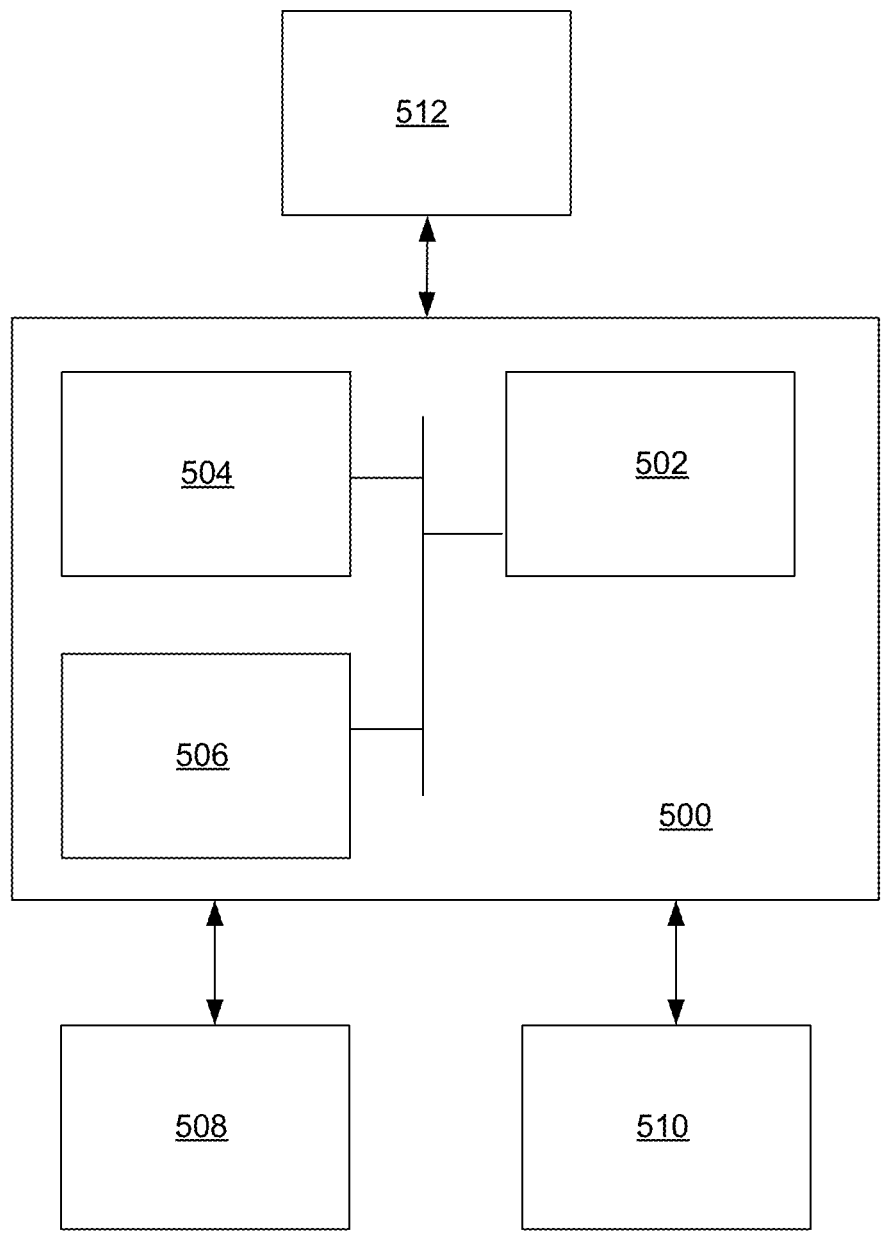
FIG. 5 shows a computer system according to aspects of the invention.

Embodiments of the invention may be implemented on virtually any type of computer regardless of the platform being used. For example, as shown in FIG. 5, a computer system (500) includes one or more processor(s) (502) (e.g., central processing unit or CPU), associated memory (504) (e.g., random document access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor) for example to display various results such as the feature vectors, the principal components, the application space, the signatures, etc. The computer system (500) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying network traffic in a network, comprising:
   generating, by a processor of a computer system during a training phase, a plurality of signatures of an application executing in the network, comprising:
   obtaining, from the network traffic, a plurality of flows generated by the application to form a training set of the application;
   extracting, based on a first pre-determined criterion, a plurality of feature vectors each from a flow in the training set, the plurality of feature vectors corresponding to a plurality of nodes in a N-dimensional space having N dimensions where N represents a count of feature elements in each of the plurality of feature vectors;
   determining, based on a second pre-determined criterion, a plurality of subspace clusters each contained in a corresponding subspace in a plurality of subspaces of the N-dimensional space and representing a portion of the plurality of nodes projected into the corresponding subspace using a subspace projection mapping, wherein the subspace projection mapping maps a feature vector in the N-dimensional space to a sub-vector in the corresponding subspace having a subset of the N dimensions, wherein the sub-vector corresponds to a subspace node in the corresponding subspace and comprises a portion of the feature elements in the feature vector corresponding to the subset of the N dimensions; and defining a region of interest based on one of the plurality of the subspace clusters in a corresponding subspace, wherein the region of interest is used as one of the plurality of signatures; and classifying, by the processor, a new flow obtained from the network traffic, comprising:

extracting, based on the first pre-determined criterion, a new feature vector from the new flow;

projecting, using the subspace projection mapping, the new feature vector into each of the plurality of subspaces to identify a corresponding subspace node in each of the plurality of subspaces;

comparing, based on a third pre-determined criterion and in each of the plurality of subspaces, a subspace cluster contained therein and the corresponding subspace node of the new feature vector extracted from the new flow to select a matched subspace cluster from the plurality of subspace clusters that is contained in a matched subspace of the plurality of subspaces, wherein the region of interest of the matched subspace cluster contains the corresponding subspace node of the new feature vector extracted from the new flow; and determining, based on the region of interest of the matched subspace cluster containing the corresponding subspace node of the new feature vector extracted from the new flow, the new flow as being generated by the application.

2. The method of claim 1, wherein the feature elements comprises a statistical measure of at least one selected from a group consisting of a packet count, a packet arrival time gap, a packet payload size, TCP/UDP flag count, out-of-sequence packet count, port numbers used, and segment size, wherein the statistical measure is calculated based on the first pre-determined criterion.

3. The method of claim 1, wherein the second pre-determined criterion comprises a first pre-determined algorithm and a second pre-determined algorithm, wherein determining, based on a second pre-determined criterion, the plurality of subspace clusters comprises:

selecting, using the first pre-determined algorithm, a portion of a total of $2^N$ subspaces of the N-dimensional space as the plurality of subspaces;

projecting, using the subspace projection mapping, the plurality of nodes in the N-dimensional space into each of the plurality of subspaces to identify a corresponding set of subspace nodes in each of the plurality of subspaces; and selecting, using the second pre-determined algorithm, a portion of the corresponding set of subspace nodes in each of the plurality of subspaces as the subspace cluster contained therein.

4. The method of claim 1, wherein the result is generated by:

analyzing, based on the third pre-determined criterion and in each of the plurality of subspaces, the subspace cluster contained therein to identify a region of interest; and analyzing, based on the third pre-determined criterion with respect to the region of interest in each of the plurality of subspaces, the corresponding subspace node projected from the new feature vector to determine a corresponding distance measure in each of the plurality of subspaces, wherein the matched subspace cluster is identified in response to the corresponding distance measure in the matched subspace being less than a first pre-determined threshold and a cardinality of the matched subspace exceeding a second pre-determined threshold.

5. The method of claim 1, wherein each of the plurality of flows is associated with a first port number configured by the application, and wherein the new flow is associated with a second port number configured by the application.

6. The method of claim 1, wherein each of the plurality of flows is associated with a first service provider of the network, and wherein the new flow is associated with a second service provider of the network.

7. The method of claim 1, further comprising:

generating, during another training phase, another plurality of signatures of another application of the plurality of applications, comprising:

obtaining another plurality of flows generated by the another application to form another training set of the another application;

extracting, based on the first pre-determined criterion, another plurality of feature vectors each from another flow in the another training set, the another plurality of feature vectors corresponding to another plurality of nodes in the N-dimensional space;

determining, based on the second pre-determined criterion, another plurality of subspace clusters each in another corresponding subspace in another plurality of subspaces of the N-dimensional space and representing a portion of the another plurality of nodes projected into the another corresponding subspace using the subspace projection mapping; and including, in each of the another plurality of signatures, one of the another plurality of the subspaces and another corresponding subspace cluster, wherein classifying the new flow further comprises:

projecting, using the subspace projection mapping, the new feature vector into each of the another plurality of subspaces to identify another corresponding subspace node in each of the another plurality of subspaces; and comparing, based on the third pre-determined criterion and in each of the another plurality of subspaces, another subspace cluster contained therein and the another corresponding subspace node to generate another result identifying another matched subspace cluster from the another plurality of subspace clusters that is contained in another matched subspace of the another plurality of subspaces, wherein determining the new flow as being generated by the application is further based on comparing the result and the another result.

8. The method of claim 7, further comprising:
comparing a cardinality of the matched subspace and another cardinality of the another matched subspace,
wherein determining the new flow as being generated by the application is in response to the cardinality exceeding the another cardinality.

9. The method of claim 7, further comprising:
comparing a distance measure identified by the result in the matched subspace and another distance measure identified by the another result in the another matched subspace,
wherein determining the new flow as being generated by the application is in response to the distance measure being less than the another distance measure.

10. A system for classifying network traffic in a network, comprising:
a hardware processor;
a signature generator executing on the hardware processor and configured to generate, during a training phase, a plurality of signatures of an application executing in the network by:
obtaining, from the network traffic, a plurality of flows generated by the application to form a training set of the application;
extracting, based on a first pre-determined criterion, a plurality of feature vectors each from a flow in the training set, the plurality of feature vectors corresponding to a plurality of nodes in a N-dimensional space having N dimensions where N represents a count of feature elements in each of the plurality of feature vectors;
determining, based on a second pre-determined criterion, a plurality of subspace clusters each contained in a corresponding subspace in a plurality of subspaces of the N-dimensional space and representing a portion of the plurality of nodes projected into the corresponding subspace using a subspace projection mapping, wherein the subspace projection mapping maps a feature vector in the N-dimensional space to a sub-vector in the corresponding subspace having a subset of the N dimensions, wherein the sub-vector corresponds to a subspace node in the corresponding subspace and comprises a portion of the feature elements in the feature vector corresponding to the subset of the N dimensions; and
defining a region of interest based on one of the plurality of the subspace clusters in a corresponding subspace, wherein the region of interest is used as one of the plurality of signatures; and
a classifier executing on the hardware processor and configured to classify a new flow obtained from the network traffic by:
extracting, based on the first pre-determined criterion, a new feature vector from the new flow;
projecting, using the subspace projection mapping, the new feature vector into each of the plurality of subspaces to identify a corresponding subspace node in each of the plurality of subspaces;
comparing, based on a third pre-determined criterion and in each of the plurality of subspaces, a subspace cluster contained therein and the corresponding subspace node of the new feature vector extracted from the new flow to select a matched subspace cluster from the plurality of subspace clusters that is contained in a matched subspace of the plurality of subspaces, wherein the region of interest of the matched subspace cluster contains the corresponding subspace node of the new feature vector extracted from the new flow; and
determining, based on the region of interest of the matched subspace cluster containing the corresponding subspace node of the new feature vector extracted from the new flow, the new flow as being generated by the application.

11. The system of claim 9, wherein the feature elements comprises a statistical measure of at least one selected from a group consisting of a packet count, a packet arrival time gap, a packet payload size, TCP/UDP flag count, out-of-sequence packet count, port numbers used, and segment size, wherein the statistical measure is calculated based on the first pre-determined criterion.

12. The system of claim 9,
wherein the second pre-determined criterion comprises a first pre-determined algorithm and a second pre-determined algorithm,
wherein determining, based on a second pre-determined criterion, the plurality of subspace clusters comprises:
selecting, using the first pre-determined algorithm, a portion of a total of $2^N$ subspaces of the N-dimensional space as the plurality of subspaces;
projecting, using the subspace projection mapping, the plurality of nodes in the N-dimensional space into each of the plurality of subspaces to identify a corresponding set of subspace nodes in each of the plurality of subspaces; and
selecting, using the second pre-determined algorithm, a portion of the corresponding set of subspace nodes in each of the plurality of subspaces as the subspace cluster contained therein.

13. The system of claim 9, wherein the result is generated by:
analyzing, based on the third pre-determined criterion and in each of the plurality of subspaces, the subspace cluster contained therein to identify a region of interest; and
analyzing, based on the third pre-determined criterion with respect to the region of interest in each of the plurality of subspaces, the corresponding subspace node projected from the new feature vector to determine a corresponding distance measure in each of the plurality of subspaces,
wherein the matched subspace cluster is identified in response to the corresponding distance measure in the matched subspace being less than a first pre-determined threshold and a cardinality of the matched subspace exceeding a second pre-determined threshold.

14. The system of claim 9,
wherein each of the plurality of flows is associated with a first port number configured by the application, and
wherein the new flow is associated with a second port number configured by the application.

15. The system of claim 9,
wherein each of the plurality of flows is associated with a first service provider of the network, and
wherein the new flow is associated with a second service provider of the network.

16. The system of claim 9,
wherein the signature generator is further configured to generate, during another training phase, another plurality of signatures of another application of the plurality of applications by:
obtaining another plurality of flows generated by the another application to form another training set of the another application;

extracting, based on the first pre-determined criterion, another plurality of feature vectors each from another flow in the another training set, the another plurality of feature vectors corresponding to another plurality of nodes in the N-dimensional space;

determining, based on the second pre-determined criterion, another plurality of subspace clusters each in another corresponding subspace in another plurality of subspaces of the N-dimensional space and representing a portion of the another plurality of nodes projected into the another corresponding subspace using the subspace projection mapping; and including, in each of the another plurality of signatures, one of the another plurality of the subspaces and another corresponding subspace cluster, wherein the classifier is further configured to classify the new flow by:

projecting, using the subspace projection mapping, the new feature vector into each of the another plurality of subspaces to identify another corresponding subspace node in each of the another plurality of subspaces; and comparing, based on the third pre-determined criterion and in each of the another plurality of subspaces, another subspace cluster contained therein and the another corresponding subspace node to generate another result identifying another matched subspace cluster from the another plurality of subspace clusters that is contained in another matched subspace of the another plurality of subspaces, wherein determining the new flow as being generated by the application is further based on comparing the result and the another result.

17. The system of claim 16, the classifier further configured to:

compare a cardinality of the matched subspace and another cardinality of the another matched subspace, wherein determining the new flow as being generated by the application is in response to the cardinality exceeding the another cardinality.

18. The system of claim 16, the classifier further configured to:

compare a distance measure identified by the result in the matched subspace and another distance measure identified by the another result in the another matched subspace, wherein determining the new flow as being generated by the application is in response to the distance measure being less than the another distance measure.

19. A non-transitory computer readable medium storing instructions for classifying network traffic in a network, the instructions, when executed by a processor of a computer, comprising functionality for:

generating, during a training phase, a plurality of signatures of an application executing in the network by:

obtaining, from the network traffic, a plurality of flows generated by the application to form a training set of the application;

extracting, based on a first pre-determined criterion, a plurality of feature vectors each from a flow in the training set, the plurality of feature vectors corresponding to a plurality of nodes in a N-dimensional space having N dimensions where N represents a count of feature elements in each of the plurality of feature vectors;

determining, based on a second pre-determined criterion, a plurality of subspace clusters each contained in a corresponding subspace in a plurality of subspaces of the N-dimensional space and representing a portion of the plurality of nodes projected into the corresponding subspace using a subspace projection mapping, wherein the subspace projection mapping maps a feature vector in the N-dimensional space to a sub-vector in the corresponding subspace having a subset of the N dimensions, wherein the sub-vector corresponds to a subspace node in the corresponding subspace and comprises a portion of the feature elements in the feature vector corresponding to the subset of the N dimensions; and defining a region of interest based on one of the plurality of the subspace clusters in a corresponding subspace, wherein the region of interest is used as one of the plurality of signatures; and classifying a new flow obtained from the network traffic by:

extracting, based on the first pre-determined criterion, a new feature vector from the new flow;

projecting, using the subspace projection mapping, the new feature vector into each of the plurality of subspaces to identify a corresponding subspace node in each of the plurality of subspaces;

comparing, based on a third pre-determined criterion and in each of the plurality of subspaces, a subspace cluster contained therein and the corresponding subspace node of the new feature vector extracted from the new flow to select a matched subspace cluster from the plurality of subspace clusters that is contained in a matched subspace of the plurality of subspaces, wherein the region of interest of the matched subspace cluster contains the corresponding subspace node of the new feature vector extracted from the new flow; and determining, based on the region of interest of the matched subspace cluster containing the corresponding subspace node of the new feature vector extracted from the new flow, the new flow as being generated by the application.

20. The non-transitory computer readable medium of claim 19, wherein the feature elements comprises a statistical measure of at least one selected from a group consisting of a packet count, a packet arrival time gap, a packet payload size, TCP/UDP flag count, out-of-sequence packet count, port numbers used, and segment size, wherein the statistical measure is calculated based on the first pre-determined criterion.

21. The non-transitory computer readable medium of claim 19, wherein the second pre-determined criterion comprises a first pre-determined algorithm and a second pre-determined algorithm, wherein determining, based on a second pre-determined criterion, the plurality of subspace clusters comprises:

selecting, using the first pre-determined algorithm, a portion of a total of $2^N$ subspaces of the N-dimensional space as the plurality of subspaces;

projecting, using the subspace projection mapping, the plurality of nodes in the N-dimensional space into each of the plurality of subspaces to identify a corresponding set of subspace nodes in each of the plurality of subspaces; and selecting, using the second pre-determined algorithm, a portion of the corresponding set of subspace nodes in each of the plurality of subspaces as the subspace cluster contained therein.

22. The non-transitory computer readable medium of claim 19, wherein the result is generated by:
- analyzing, based on the third pre-determined criterion and in each of the plurality of subspaces, the subspace cluster contained therein to identify a region of interest; and
- analyzing, based on the third pre-determined criterion with respect to the region of interest in each of the plurality of subspaces, the corresponding subspace node projected from the new feature vector to determine a corresponding distance measure in each of the plurality of subspaces,
- wherein the matched subspace cluster is identified in response to the corresponding distance measure in the matched subspace being less than a first pre-determined threshold and a cardinality of the matched subspace exceeding a second pre-determined threshold.

23. The non-transitory computer readable medium of claim 19,
- wherein each of the plurality of flows is associated with a first port number configured by the application, and
- wherein the new flow is associated with a second port number configured by the application.

24. The non-transitory computer readable medium of claim 19,
- wherein each of the plurality of flows is associated with a first service provider of the network, and
- wherein the new flow is associated with a second service provider of the network.

25. The non-transitory computer readable medium of claim 19, the instructions, when executed by the processor, further comprising functionality for:
- generating, during another training phase, another plurality of signatures of another application of the plurality of applications, comprising:
  - obtaining another plurality of flows generated by the another application to form another training set of the another application;
  - extracting, based on the first pre-determined criterion, another plurality of feature vectors each from another flow in the another training set, the another plurality of feature vectors corresponding to another plurality of nodes in the N-dimensional space;
  - determining, based on the second pre-determined criterion, another plurality of subspace clusters each in another corresponding subspace in another plurality of subspaces of the N-dimensional space and representing a portion of the another plurality of nodes projected into the another corresponding subspace using the subspace projection mapping; and
  - including, in each of the another plurality of signatures, one of the another plurality of the subspaces and another corresponding subspace cluster,
- wherein classifying the new flow further comprises:
  - projecting, using the subspace projection mapping, the new feature vector into each of the another plurality of subspaces to identify another corresponding subspace node in each of the another plurality of subspaces; and
  - comparing, based on the third pre-determined criterion and in each of the another plurality of subspaces, another subspace cluster contained therein and the another corresponding subspace node to generate another result identifying another matched subspace cluster from the another plurality of subspace clusters that is contained in another matched subspace of the another plurality of subspaces,
- wherein determining the new flow as being generated by the application is further based on comparing the result and the another result.

26. The non-transitory computer readable medium of claim 25, the instructions, when executed by the processor, further comprising functionality for:
- comparing a cardinality of the matched subspace and another cardinality of the another matched subspace,
- wherein determining the new flow as being generated by the application is in response to the cardinality exceeding the another cardinality.

27. The non-transitory computer readable medium of claim 25, the instructions, when executed by the processor, further comprising functionality for:
- comparing a distance measure identified by the result in the matched subspace and another distance measure identified by the another result in the another matched subspace,
- wherein determining the new flow as being generated by the application is in response to the distance measure being less than the another distance measure.

* * * * *